United States Patent [19]

Lambert et al.

[11] 4,439,719
[45] Mar. 27, 1984

[54] VARIABLE TIMING CIRCUIT FOR MOTIVE POWER BATTERY CHARGERS

[75] Inventors: Frederic J. Lambert, Morrisville, Pa.; Donald J. Bosack, Barrington; David K. Johansen, Lake in the Hills, both of Ill.

[73] Assignee: GNB Batteries Inc., Mendota Heights, Minn.

[21] Appl. No.: 396,675

[22] Filed: Jul. 9, 1982

[51] Int. Cl.³ ............................................. H02J 7/04
[52] U.S. Cl. ..................................... 320/31; 320/37; 320/39; 320/48
[58] Field of Search ....................... 320/29, 31, 30, 33, 320/37, 38, 39, 40, 48

[56] References Cited

U.S. PATENT DOCUMENTS

| | | |
|---|---|---|
| 3,123,759 | 3/1964 | Grey . |
| 3,296,515 | 1/1967 | Knauth . |
| 3,383,584 | 5/1968 | Atherton . |
| 3,414,774 | 12/1968 | Motta .................................. 320/31 |
| 3,417,307 | 12/1968 | Kosa et al. . |
| 3,419,779 | 12/1968 | Zehner . |
| 3,523,278 | 8/1970 | Hinkel . |
| 3,835,362 | 9/1974 | Greene ................................. 320/31 |
| 3,876,950 | 4/1975 | O'Connor . |
| 4,011,517 | 3/1977 | Pommerening et al. . |
| 4,091,320 | 5/1978 | Foster . |
| 4,097,792 | 6/1978 | Calaway . |
| 4,136,310 | 1/1979 | Foster ................................. 320/37 |
| 4,140,958 | 2/1979 | Groeschel . |
| 4,220,905 | 9/1980 | Quarton . |

Primary Examiner—William M. Shoop
Assistant Examiner—Anita M. Ault
Attorney, Agent, or Firm—John R. Garrett; Augustus J. Hipp

[57] ABSTRACT

A timing circuit for charging motive power batteries (B). The timing control circuit (25) provides different times of charge in accordance with the time at which a predetermined voltage/current state of the battery is achieved. Control circuit (25) cooperates with a controller (18) in causing termination of the charging operation immediately upon reaching of the voltage/current state if this occurs in a first time slot of an initial control time period. The timing circuit (25) provides an automatic finish time period of charge if the battery (B) reaches the predetermined voltage/current state at some time during the initial control time period. The control includes a switch (23) permitting the user to cause an automatic additional amount of charging upon completion of the normal charging cycle effected by the control, such as for effecting a weekend charge. The control further includes structure for terminating the charging operation in the event the battery being charged does not reach the predetermined voltage/current state at the end of a preselected maximum time. A signal light (24) signals such a fault condition in the charging operation.

30 Claims, 2 Drawing Figures

VARIABLE TIMING CIRCUIT FOR MOTIVE POWER BATTERY CHARGERS

DESCRIPTION

1. Technical Field

This invention relates to battery chargers and in particular to means for providing automatic controlled recharging of motive power batteries and the like.

2. Description of the Background Art

It has been conventional to effect recharging of motive power batteries by controlling the charge time through a motor-driven timer. In one use of such a timer, the duration of the charging cycle has been caused to be equal to the time set on the timer by the user.

Alternatively, such timers have been utilized to provide a supplemental time of charging after the battery reaches a gassing point.

Such a manually set timer charge control has the serious disadvantage of inaccurately correlating the total time of charge with a number of factors which it has been found should be considered in determining the optimum charge time. Illustratively, it has been found that the state of charge of the battery at the beginning of the recharge cycle, the temperature of the battery, the age of the battery, the general condition of the battery, the ratio of the battery charger ampere-hour capacity to the battery rated ampere-hour capacity, are all factors which should be considered in determining an optimum charge time.

Because such factors cannot be readily considered in the ordinary manual time-setting operation, the usual procedure utilizing such motor-driven timer control is to set the timer to a preselected time, such as eight hours where the entire operation is time-controlled, and three hours where the charging after reaching the gassing point method is utilized. These times are determined as a compromise, or average, time based on batteries of ordinary average condition discharged to approximately 80 percent of their full capacity and at a temperature of 77° F., with a charger having an ampere-hour rating substantially equal to the rated capacity of the battery. In almost no case are all of these parameters effectively present, and, thus, in almost all cases, the recharging of the battery by the motor-driven timer is not an optimum recharging operation.

One battery charger control circuit for use in automatically recharging batteries is illustrated in U.S. Letters Pat. No. 4,097,792 of Ward M. Calaway. The control circuit measures the battery potential during the charging operation and, when the potential reaches a predetermined value above the low rate of voltage change region of the battery, a timing counter begins to detect the rate of change of potential of the battery until, when the battery is fully charged, the rate of change falls below a predetermined minimum rate of change.

David W. Zehner, in U.S. Letters Pat. No. 3,419,779, illustrates a system for removing a defective battery from a charging circuit, including circuit means for disconnecting the charging circuit from a battery when the difference in voltage between the power supply means and the battery exceeds a predetermined value and for again connecting the charging circuit when the voltage across a load device connected to the battery falls below a predetermined value.

DISCLOSURE OF THE INVENTION

The present invention comprehends an improved motive power battery charger providing different charging periods which are automatically correlated with a number of different battery charging parameters to provide an improved recharging of a battery to its initial state of charge without an excessive overcharge.

The circuit is arranged to provide such recharging regardless of the initial state of charge of the battery, its temperature, its age, its condition, and the ratio of the battery charger ampere capacity to the battery rated ampere-hour capacity.

The charger includes an improved timing circuit controlled as a function of the time when a battery parameter reaches a predetermined voltage-current state.

The voltage/current state is a general term referring to a voltage state, a current state or a state defined by a combination of the voltage state and the current state. The voltage state may be the actual voltage across the terminals of the battery. The current state may be the amount of current flowing into the battery during the charging operation.

The timing circuit discriminates between a shallow discharge and a normal discharge of the battery by terminating the recharging operation immediately when the battery reaches the voltage/current state if that occurs during a first time slot in an initial control time period. If the battery does not reach the voltage/current state during the first time slot, the battery charging operation is continued for a further, finish time period after the initial control time period.

The control senses the occurrence of the battery reaching the voltage/current state during the initial control time period in any one of a plurality of different time slots of the initial control time period, and provides a finish time period correlated with the particular time slot of the initial control time period in which the voltage/current state is reached.

The finish time periods differ in accordance with the time necessary to provide an effectively optimum recharging of the battery as a function of the time in which the battery reaches the voltage/current state during the initial control time period.

The control further includes means for terminating the charging operation at the end of a preselected maximum period of time, as indicative of a fault in the charging operation either caused by the battery or by the charging apparatus.

A signal is provided for indicating such a fault condition.

The control further provides for an equalizing charging mode wherein the battery is charged for a further period of time upon termination of the normal automatic recharging cycle. Such an equalizing charge, for example, may be effected on weekends and is conventionally referred to as a "weekend charge." The control is arranged to provide such a weekend charge as a result of an original setting of the control prior to effecting the normal automatic recharging of the battery.

The control circuitry comprises digital electronic circuitry which is simple and economical of construction while yet providing the highly desirable battery charge control discussed above.

BRIEF DESCRIPTION OF THE DRAWING

Other features and advantages of the invention will be apparent from the following description taken in connection with the accompanying drawing wherein.

BEST MODE FOR CARRYING OUT THE INVENTION

Figure 1:
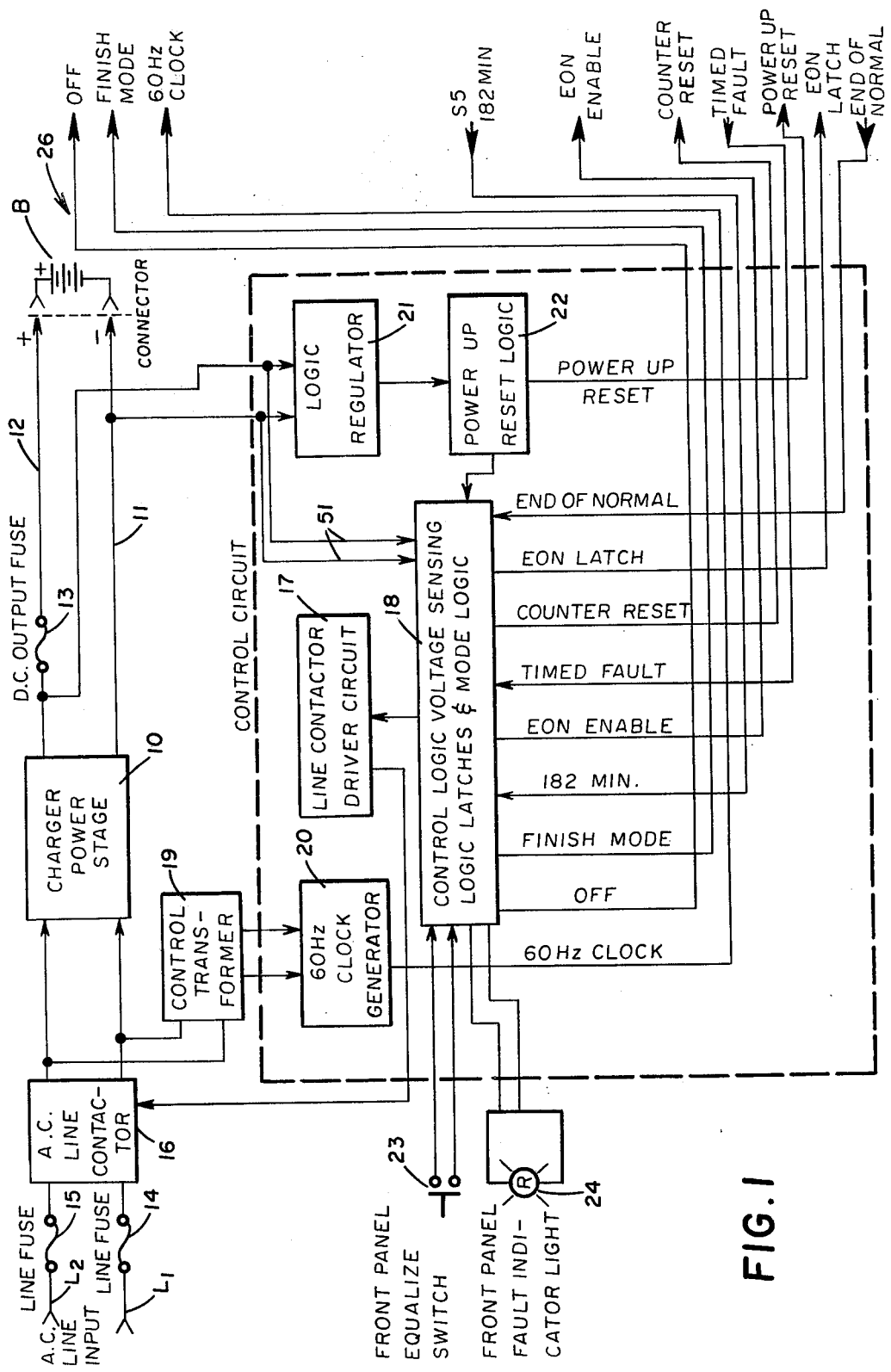
FIG. 1 is a schematic block diagram illustrating a portion of the battery charging apparatus embodying the invention.

In the exemplary embodiment of the invention as disclosed in the drawing of FIG. 1, a battery B to be charged is suitably connected to a charger power stage 10 by charging lines 11 and 12. As shown, charging line 12 may be provided with a protective fuse 13 in a conventional manner. Power is supplied to the power charger stage 10 from a suitable alternating current power supply line, such as defined by power leads L1 and L2, which may be provided with protective line fuses 14 and 15, respectively. Power delivery to the power charger stage from the power supply leads is controlled by a conventional alternating current line contactor 16, operation of which is controlled by a conventional line contactor driver circuit 17 of a conventional controller 18, including control logic, voltage sensing, logic latches, and mode logic components of conventional construction.

A conventional control transformer 19 is connected across the power supply leads and operates a 60 Hz. clock generator 20.

As further shown in FIG. 1, a logic regulator 21 is connected across leads 11 and 12 and is connected in series with a Power Up Reset logic circuit 22 which provides a suitable Power Up Reset logic signal to the controller 18. The battery voltage is provided to the controller 18 by connection to leads 11 and 12.

A front panel Equalize switch 23 is connected to the controller 18 for manual control of the battery charging operation. A front panel Fault indicator light 24 is provided for indicating to the user a fault in the battery charging operation.

A timed charging control circuit generally designated 25 is connected to the components discussed above by suitable interconnection generally designated 26. The charging control circuit 25 provides a unique control of the charging of the battery B, permitting the recharging of the battery to an optimum level regardless of the discharge depth. Control circuit 25 effects such recharging by causing the recharging time to be any one of a plurality of different discrete periods. Briefly, the control circuit 25 comprises means for varying the time during which the battery is being charged. The total charge time is made to be dependent on the voltage sensing means of the controller 18 sensing the battery reaching a predetermined voltage state hereinafter referred to as a finish voltage or Finish Mode voltage. If that voltage is sensed during an initial control time period, charging of the battery is terminated at that point. If the battery has not reached the finish voltage at the end of a first time slot of the initial control time period, which, in the illustrated embodiment, is 36 minutes and 24 seconds, the timing operation continues. The initial control time period is broken down into a plurality of discrete sections and, in the illustrated embodiment, is divided into five sections. The control 25 is arranged to provide a different, final finish time period corresponding to the time at which the battery reaches the predetermined voltage state or finish voltage, i.e. during one of the five different time slots of the initial control time period. The control circuit is further arranged to terminate all charging if the voltage sensed by the sensing means of the controller 18 does not reach the predetermined voltage state at the end of the initial control time period.

The preferred embodiment uses a predetermined voltage state or finish voltage to determine when the initial control time period ends and the final time period begins. However, a current state or a voltage/current state, in general, could also be used instead of the voltage state without departing from the present invention.

The invention further comprehends modification in the charging process permitting the provision of an additional three-hour charge to the battery following the normal full charge thereof effected by the automatic control means. Thus, the switch 23 selects the operation of the controller 18 to effect such an equalization mode of charging.

Figure 2:
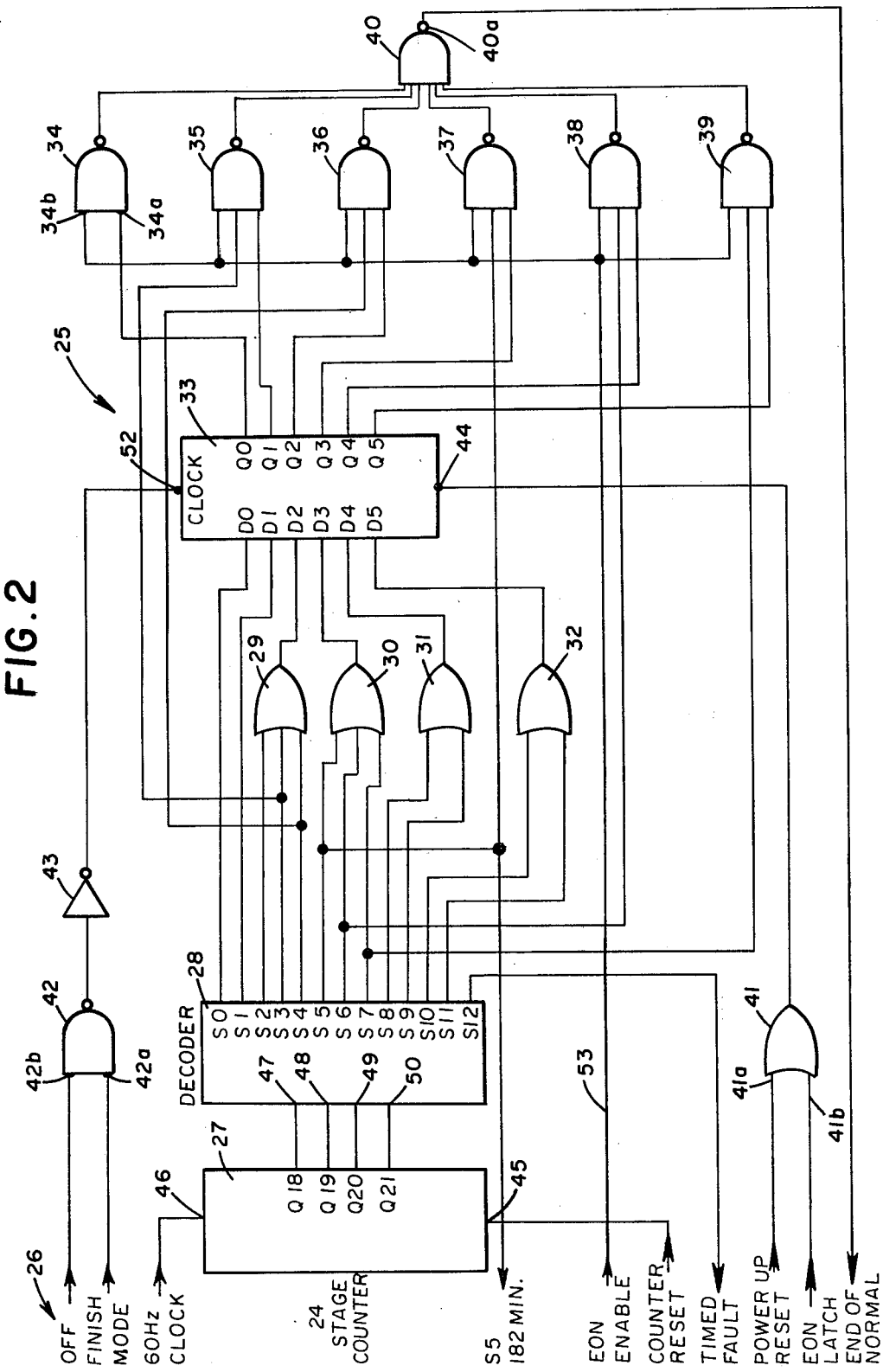
FIG. 2 is a schematic block wiring diagram of the timing circuit portion of the control.

More specifically, with reference to FIG. 2, control circuit 25 includes a 24-stage counter clock 27, a decoder 28, OR gates 29, 30, 31 and 32, a Hex "D" flip-flop 33, NAND gates 34, 35, 36, 37, 38, 39 and 40, an OR gate 41, a NAND gate 42, and an inverter 43. These elements are interconnected, as shown in FIG. 2, in a novel manner to provide the improved functioning of the control 25, as discussed above.

More specifically, when the control 25 is energized, a Power Up Reset logic signal is received from circuit 22 on input 41a of OR gate 41. This signal normalizes all of the bistable components of the circuit 25 to a desired initial logic state. The Power Up logic signal received from circuit 22 remains at a high logic level for about 10 msec. A signal is delivered from circuit 22 to the controller 18, which provides an End of Normal Latch signal by resetting a suitable flip-flop in controller 18 to latch the End of Normal signal provided thereto at a high logic level. Resultingly, OR gate 41 provides to reset terminal 44 of flip-flop 33 a low logic level signal of a 10 msec. duration for clearing the flip-flop to low logic levels on all of its "Q" outputs, Q0, Q1, Q2, Q3, Q4 and Q5.

At the same time, controller 18 provides a pulsed 8.3 msec. signal on the Counter Reset terminal 45 of counter 27, as a result of sensing of the Power Up Reset. The Counter Reset signal is maintained at a high logic level for approximately 5 seconds by the nominal turn-on delay time of the controller 18, thereby maintaining all of the Q outputs Q18, Q19, Q20, and Q21 of the 24-stage counter 27 at low logic levels at this time.

Concurrently, the 60 Hz. clock generator 20 is energized from the control transformer 19 to provide clock pulses to the clock terminal 46 of counter 27 so that the 60 Hz. clock stage clocks the Counter Reset stage, causing it to go to a low logic level and thereby enabling the 24-stage counter 27 to start counting the clock pulses.

As shown in FIG. 2, input terminals 47, 48, 49 and 50 of decoder 28 are connected respectively to the Q18, Q19, Q20 and Q21 output terminals of the counter 27.

Decoder 28 comprises a 1 of 16 decoder of conventional construction. In the illustrated embodiment, 13 of the decoder outputs are utilized, being identified as outputs S0, S1, S2, S3, S4, S5, S6, S7, S8, S9, S10, S11 and S12.

Upon Power Up Reset, all of the outputs Q18–Q21 of counter 27 are at low logic level. Decoder 28 decodes the binary count represented by the outputs from the counter 27 into the indicated 13 time slots of the decoder output. At reset, decoder output S0 is at a high logic level and is maintained at the high logic level until counter output Q18 goes to a high logic level. Counter 27 is arranged so that Q18 goes to such a high logic level after $2^{17}$ counts which, with the 60 Hz. clock, is reached in 36 minutes 25 seconds. As long as output S0 is maintained at the high logic level, input terminal D0 of flip-flop 33 is enabled.

Controller 18 proivdes a Finish Mode signal to input terminal 42a of NAND gate 42 by means of a conventional comparator circuit therein sensing the voltage of battery B as through input lines 51, as shown in FIG. 1. Thus, if at any time during the first 36 minutes and 25 seconds following Power Up, a Finish Mode signal indicating that the battery voltage has reached a predetermined voltage state, a high level signal is provided by means of NAND gate 42 and inverter 43 to the clock terminal 52 of the flip-flop 33. This clocks the high level signal on input D0 of flip-flop 33 to produce a high level signal at output Q0 of the flip-flop. In providing such control of the flip-flop, it should be noted that the Off signal on input terminal 42b of the NAND gate 42 is normally a high logic level signal during energization of the control.

The leading positive going edge of the pulsed signal provided to clock terminal 52 latches the logic levels existing on all of the inputs of the flip-flop into the corresponding outputs. In the normal operation of the circuit, only one of the D inputs is enabled at a given time and, thus, only one of the outputs of the flip-flop is caused to produce a high level signal as a result of the Finish Mode signal applied to NAND gate terminal 42a.

As discussed above, when the high logic signal is applied to clock input 52 during the first 36 minutes and 25 second time slot determined by decoder 28, the high logic level output signal from flip-flop 33 is that provided on output Q0 which, as shown in FIG. 2, is connected to an input terminal 34a of NAND gate 34.

At the same time, the Finish Mode signal causes controller 18 to provide a Counter Reset pulsed signal to the reset terminal 45 of counter 27, which resets the counter.

On the falling edge of the Counter Reset signal, controller 18 produces an End of Normal Enable signal to a bus 53 which is connected to one input of each of the NAND gates 34–39. The End of Normal Enable signal goes to a high logic level at this time and, thus, provides a second high logic level signal to the NAND gate 34 on the input terminal 34b thereof. Resultingly, the output of NAND gate 34 goes to a low logic level causing the NAND gate 40 to go to a high logic level, thereby terminating the charge cycle by providing an End of Normal high logic level signal from the output 40a of the NAND gate 40 to the controller 18.

In brief summary, if the controller 18 senses the voltage of battery B rising to a preselected Finish Mode voltage during the first time slot of decoder 28 corresponding to a time period in the illustrated embodiment of 36 minutes and 25 seconds, the apparatus causes termination of the charging operation immediately upon such determination.

In the event the Finish Mode voltage is not sensed during the first time slot period, the control can provide five additional time slots extending from 36 minutes and 25 seconds in the illustrated embodiment to 7 hours and 17 minutes. The different time slots are illustrated in the following chart:

| Latch-Decode output | Beginning of Charge to Finish Mode Time | |
|---|---|---|
| | Minimum | Maximum |
| S0 | 0 minutes | 36 min. 24 sec. |
| S1 | 36 min. 25 sec. | 72 min. 49 sec. |
| S2-S3-S4-29 | 72 min. 50 sec. | 145 min. 39 sec. |
| S5-S6-S7-30 | 145 min. 40 sec. | 254 min. 54 sec. |
| S8-S9-31 | 254 min. 55 sec. | 327 min. 44 sec. |
| S10-S11-32 | 327 min. 45 sec. | 436 min. 59 sec. |
| S12 | 437 minutes | 437 minutes |

| Latch-Decode output | Resulting Finish Mode Time | End of Normal Decode Gate |
|---|---|---|
| S0 | 0 minutes | 34 |
| S1 | 109 min. 15 sec. | 35 |
| S2-S3-S4-29 | 145 min. 40 sec. | 36 |
| S5-S6-S7-30 | 182 min. 05 sec. | 37 |
| S8-S9-31 | 218 min. 30 sec. | 38 |
| S10-S11-32 | 254 min. 55 sec. | 39 |
| S12 | 0 minutes | 18 |

More specifically, the five Finish Mode time slots are decoded by a combination of the decoder 28 and different ones of the OR gates 29, 30, 31 and 32. In the conventional manner, the different outputs of decoder 28 go high at the different corresponding counts of the binary signals applied to the inputs 47, 48, 49 and 50 thereof. Again, when a Finish Mode voltage is determined by the comparator means of controller 18, a positive going pulse is applied to terminal 52 through the NAND gate 42 and inverter 43. Depending on which of the inputs of flip-flop 33 is enabled at the time the pulse is delivered to clock terminal 52, a corresponding Q output is latched to a high logic level.

As shown in FIG. 2, the Q outputs of the flip-flop 33 are selectively connected to the different NAND gates 34–39. Thus, a high logic level signal on any of the Q outputs enables a corresponding one of the NAND gates 34–39.

At the same time, controller 18 provides a Counter Reset signal to counter 27 as a result of the determination of the battery voltage reaching the preselected finish voltage. On the falling edge of the Counter Reset signal, controller 18 causes the End of Normal Enable signal to be switched to a high logic level.

Counter 27 now starts counting a Finish Mode time, with the output thereof being decoded by decoder 28, to provide the different Finish Mode times set out in the above chart.

When all of the inputs to one of the NAND gates 34–39 goes high, the output thereof switches to a low logic level which causes the output of the NAND gate 40 to switch to a high logic level providing an End of Normal signal for terminating the charging of the battery as discussed above. Thus, different finish time periods are provided corresponding to different times during the initial control time period at which the sensed battery voltage reaches the Finish Mode voltage. Illustratively, if the battery voltage reaches the Finish Mode voltage at some point during the first time slot S1 of decoder 28, which is the time period of 36 minutes 25 seconds to 72 minutes 49 seconds after original start-up, control circuit 25 automatically causes the charging operation to continue for 109 minutes and 15 seconds after such determination. If the sensed battery voltage does not reach the Finish Mode until some time during the second time slot controlled by outputs S2, S3 and S4 of decoder 28 and OR gate 29, which extends from 72 minutes 50 seconds to 145 minutes 39 seconds after initial start-up, the control causes the charging operation to continue for 145 minutes 40 seconds after determination of the battery reaching the Finish Mode charge. The other finish times are similarly determined.

Thus, the NAND gates 34-39 effectively comprise End of Normal decoding gates for terminating the charging of the battery. Gate 34 effects an immediate termination, as discussed above, and gates 35-39 provide supplemental finish time periods where the Finish Mode voltage is reached during the initial control time period extending from 36 minutes 25 seconds to 436 minutes and 59 seconds, as indicated in the chart.

The Equalize switch 23 is connected to the controller 18 to cooperate with a 182-minute connection from decoder output S5 to provide an additional 182-minute charge to the battery after termination of the charging operation in the normal manner. Such an equalization charge may, for example, be effected weekly as on a Friday night, and is well-known in the art as comprising a weekend charge.

More specifically, as discussed above, at the end of the normal charge cycle wherein the output of NAND gate 40 switches to a high logic level, the 24-stage counter 27 is reset to zero and the End of Normal Latch is set to cause the End of Normal Latch signal to go to a low logic level, causing the output of the OR gate 41 to go low. This second pulse applied to the reset terminal 44 of flip-flop 33 flips the flip-flop to reset it for the remainder of the charge cycle, thereby disabling all of the End of Normal decode NAND gates 34-39. The charging is therefore continued until decoder 28 counts to the S5 value, which, in the illustrated embodiment, is 182 minutes and 5 seconds. When the signal is provided from the S5 output of decoder 28, it is transmitted to the controller 18 for effecting the end of the equalizing charge.

As indicated in FIG. 2, the decoder 28 output S12 is connected to the controller 18 by a Timed Fault connection. If the S12 count is reached by the counter 27, a high logic level output on terminal S12 is provided through the Timed Fault line to controller 18 for causing the controller to open the AC line contactor 16 and thereby terminate further charging of the battery even though no Finish Mode voltage has been sensed. At the same time, as shown in FIG. 1, a Front Panel Fault indicator light 24 is illuminated to advise the operator that some form of failure has occurred in the charging operation. Such a failure, for example, can be due to battery failure, such as a shorted cell thereof, an oversize battery being charged in the system, an excessively discharged battery being charged, a circuit component failure, etc.

As discussed above, counter 27 is reset at the end of the initial control time period, as well as upon the sensing of the battery reaching the Finish Mode voltage to provide the different charging times discussed above. The Timed Fault determination of the battery charging operation is effected in any one of these time modes whenever the count reaches the decoder output S12 time slot.

Thus, the improved control circuit 25 provides different amounts of charge to the battery depending on the initial condition of the battery. If the battery has only a shallow depth of discharge, the charging operation is effectively automatically terminated during the first time slot of from zero to 36 minutes and 24 seconds. Where the battery has been discharged to a normal depth of discharge, the recharging operation continues to beyond the 36 minute-24 second period until a finish voltage is sensed. The sensing of the battery reaching the finish voltage during the different intervals causes the control to provide different amounts of finish charging so as to provide an optimum recharging of the battery under different discharge conditions.

The control automatically terminates charging of the battery when an excessively long charge time occurs without the battery reaching the finish voltage.

The control is extremely simple and economical of construction while yet providing an improved battery charging operation as discussed above.

INDUSTRIAL APPLICABILITY

The invention is useful in a wide range of industrial battery recharging applications. The control provides an improved optimum recharging of the battery so as to provide long troublefree life thereof notwithstanding a wide range of different discharge conditions of the battery.

The foregoing disclosure of specific embodiments is illustrative of the broad inventive concepts comprehended by the invention. For example, there is essentially no limit on the number of control time periods and finish time periods.

We claim:

1. In an apparatus for automatically charging a battery to a preselected full charge state at which the battery has a predetermined voltage/current state, said apparatus having charging means for charging the battery, and sensing means for sensing the state of the battery during charging thereof by said charging means, an improved charge control circuit comprising:
    means for causing the charging means to charge the battery for an initial control time period;
    means for establishing a plurality of different finish time periods;
    means for determining the time at which the state of the battery reaches said predetermined voltage/current state during said initial control time period; and
    means for causing the charging means to continue to charge the battery after the determination of said time for one of said different finish time periods corresponding to said time determination.

2. The battery charging apparatus of claim 1, wherein said charge control circuit includes a counter for timing said initial control time period and means for resetting said counter, said counter being reset by said resetting means as a result of the sensed battery voltage reaching a predetermined voltage/current state during said initial control time period to time the finish time period.

3. The battery charging apparatus of claim 1, wherein said charge control circuit includes a plurality of bistable elements, a counter, and means for resetting said counter, said bistable elements and counter cooperatively comprising said means for establishing said finish time periods.

4. The battery charging apparatus of claim 1, wherein said charge control circuit includes a plurality of bistable gates, means for enabling said gates selectively as a function of said time determination, and clock means for controlling the switching of a selectively enabled gate to effect the charging for a selected finish time period.

5. In an apparatus for automatically charging a battery to a preselected full charge state at which the battery has a predetermined voltage/current state, said apparatus having charging means for charging the battery, and sensing means for sensing the state of the battery during charging thereof by said charging means, an improved charge control circuit comprising:
   means for causing the charging means to charge the battery for an initial control time period;
   means for establishing a plurality of different finish time periods;
   means for determining the time at which the battery state reaches said predetermined voltage/current state during said initial control time period;
   means for causing the charging means to continue to charge the battery after the determination of said time for one of said different finish time periods corresponding to said time determination; and
   means for terminating the charging of the battery by said charging means in the event no determination of said battery state reaching said voltage/current full charge state is made during said initial control time period.

6. The battery charging apparatus of claim 5, wherein said means for terminating the charging comprises a clocked counter, and a decoder connected to the counter, said decoder providing a charge terminating signal as a result of the decoded count of said counter reaching a preselected high count.

7. The battery charging apparatus of claim 5, wherein said means for terminating the charging comprises a clocked counter, means for resetting the counter in the event the sensing means senses the battery state reaching said voltage/current state during said initial control time period, and a decoder connected to said counter, said decoder providing a charge terminating signal as a result of the decoded count of said counter reaching a preselected high count in the absence of resetting of the counter by said resetting means.

8. In an apparatus for automatically charging a battery to a preselected full charge state at which the battery has a predetermined current state, said apparatus having charging means for charging the battery, and sensing means for sensing the current provided to the battery during charging thereof by said charging means, an improved charge control circuit comprising:
   means for causing the charging means to charge the battery for an initial control time period;
   means for disabling the charging means at any time during said initial control time period in the event the sensing means senses the current to the battery becoming said predetermined current state thereof;
   means for establishing a plurality of different finish time periods;
   means for determining the time at which the current to the battery reaches said predetermined current state during said initial control time period; and
   means for causing the charging means to continue to charge the battery after the determination of said time for one of said different finish time periods corresponding to said time determination.

9. The battery charging apparatus of claim 8, wherein said charge control circuit includes a counter for timing said initial control time period and means for resetting said counter, said counter being reset by said resetting means as a result of the sensed current to the battery reaching said predetermined current state during said initial control time period to time the finish time period.

10. The battery charging apparatus of claim 8, wherein said charge control circuit includes a plurality of bistable elements, a counter, and means for resetting said counter, said bistable elements and counter cooperatively comprising said means for establishing said finish time periods.

11. The battery charging apparatus of claim 8, wherein said charge control circuit includes a plurality of bistable gates, means for enabling said gates selectively as a function of said time determination, and clock means for controlling the switching of a selectively enabled gate to effect the charging for a selected finish time period.

12. The battery charging apparatus of claim 8, wherein said disabling means comprises a flip-flop having a clock input, a bistable gate, and means for switching said gate to provide an output signal for terminating said battery charging as an incident of a signal being applied to said clock input as a result of the sensing means sensing the current to the battery reaching said predetermined current state during said initial control period.

13. In an apparatus for automatically charging a battery to a preselected full charge state at which the battery has a predetermined current state, said apparatus having charging means for charging the battery, and sensing means for sensing the current provided to the battery during charging thereof by said charging means, an improved charge control circuit comprising:
   means for causing the charging means to charge the battery for an initial control time period;
   means for disabling the charging means at any time during said initial control time period in the event the sensing means senses the current to the battery becoming said predetermined current state thereof;
   means for establishing a plurality of different finish time periods;
   means for determining the time at which the current to the battery reaches said predetermined current state during said initial control time period;
   means for causing the charging means to continue to charge the battery after the determination of said time for one of said different finish time periods corresponding to said time determination; and
   means for terminating the charging of the battery by said charging means in the event no determination of said current to the battery reaching said predetermined current state is made during said initial control time period.

14. The battery charging apparatus of claim 13, wherein said means for terminating the charging comprises a clocked counter, and a decoder connected to the counter, said decoder providing a charge terminating signal as a result of the decoded count of said counter reaching a preselected high count.

15. The battery charging apparatus of claim 13, wherein said means for terminating the charging comprises a clocked counter, means for resetting the counter in the event the sensing means senses the current to the battery reaching said predetermined current state during said initial control time period, and a decoder connected to said counter, said decoder providing a charge terminating signal as a result of the decoded count of said counter reaching a preselected high count in the absence of resetting of the counter by said resetting means.

16. In an apparatus for automatically charging a battery to a preselected full charge state at which the battery has a predetermined voltage state, said apparatus having charging means for charging the battery, and sensing means for sensing the voltage of the battery during charging thereof by said charging means, an improved charge control circuit comprising:
- means for causing the charging means to charge the battery for an initial control time period;
- means for disabling the charging means at any time during said initial control time period in the event the sensing means senses the battery voltage becoming said predetermined voltage state thereof;
- means for establishing a plurality of different finish time periods;
- means for determining the time at which the battery voltage reaches a predetermined voltage state during said initial control time period; and
- means for causing the charging means to continue to charge the battery after the determination of said time for one of said different finish time periods corresponding to said time determination.

17. The battery charging apparatus of claim 16, wherein said charge control circuit includes a counter for timing said initial control time period and means for resetting said counter, said counter being reset by said resetting means as a result of the sensed battery voltage reaching said predetermined voltage state during said initial control time period to time the finish time period.

18. The battery charging apparatus of claim 16, wherein said charge control circuit includes a plurality of bistable elements, a counter, and means for resetting said counter, said bistable elements and counter cooperatively comprising said means for establishing said finish time periods.

19. The battery charging apparatus of claim 16, wherein said charge control circuit includes a plurality of bistable gates, means for enabling said gates selectively as a function of said time determination, and clock means for controlling the switching of a selectively enabled gate to effect the charging for a selected finish time period.

20. The battery charging apparatus of claim 16, wherein said disabling means comprises a flip-flop having a clock input, a bistable gate, and means for switching said gate to provide an output signal for terminating said battery charging as an incident of a signal being applied to said clock input as a result of the sensing means sensing the battery voltage reaching said predetermined voltage state during said initial control time period.

21. In an apparatus for automatically charging a battery to a preselected full charge state at which the battery has a predetermined voltage state, said apparatus having charging means for charging the battery, and sensing means for sensing the voltage of the battery during charging thereof by said charging means, an improved charge control circuit comprising;
- means for causing the charging means to charge the battery for an initial control time period;
- means for disabling the charging means at any time during said initial control time period in the event the sensing means senses the battery voltage becoming said predetermined voltage state thereof;
- means for establishing a plurality of different time periods;
- means for determining the time at which the battery voltage reaches said predetermined voltage state during said initial control time period;
- means for causing the charging means to continue to charge the battery after the determination of said time for one of said different finish time periods corresponding to said time determination; and
- means for terminating the charging of the battery by said charging means in the event no determination of said battery voltage reaching said predetermined voltage state is made during said initial control time period.

22. The battery charging apparatus of claim 21, wherein said means for terminating the charging comprises a clocked counter, and a decoder connected to the counter, said decoder providing a charge terminating signal as a result of the decoded count of said counter reaching a preselected high count.

23. The battery charging apparatus of claim 21, wherein said means for terminating the charging comprises a clocked counter, means for resetting the counter in the event the sensing means senses the battery voltage reaching said predetermined voltage state during said initial control time period, and a decoder connected to said counter, said decoder providing a charge terminating signal as a result of the decoded count of said counter reaching a preselected high count in the absence of resetting of the counter by said resetting means.

24. In an apparatus for automatically charging a battery to a preselected full charge state at which the battery has a predetermined voltage/current state, said apparatus having charging means for charging the battery, and sensing means for sensing the state of the battery during charging thereof by said charging means, an improved charge control circuit comprising:
- means for causing the charging means to charge the battery for an initial control time period;
- means for disabling the charging means at any time during said initial control time period in the event the sensing means senses the battery state becoming said predetermined voltage/current state thereof;
- means for establishing a plurality of different finish time periods;
- means for determining the time at which the battery state reaches said preselected voltage/current state during said initial control time period;
- means for causing the charging means to continue to charge the battery after the determination of said time for one of said different finish time periods corresponding to said time determination; and
- means for selectively causing a preselected additional charging of the battery by said charging means following the end of the finish time period.

25. The battery charging apparatus of claim 24, wherein said means for causing the preselected additional charging comprises manually settable means.

26. The battery charging apparatus of claim 24, wherein said means for causing the preselected additional charging comprises means responsive to a determination of battery state reaching said predetermined voltage/current state for automatically initiating said additional charging.

27. In an apparatus for automatically charging a battery to a preselected full charge state at which the battery has a predetermined voltage/current state said apparatus having charging means for charging the battery, and sensing means for sensing the state of the battery during charging thereof by said charging means, an improved charge control circuit comprising:
- means for establishing a plurality of different finish time periods;
- means for establishing a series of successive time slots of an initial control time period;
- means for causing the charging means to charge the battery to said predetermined voltage/current state during said series of time slots;
- means for determining the one of said successive time slots in which the sensed battery state reaches said predetermined voltage/current state; and
- means for causing the charging means to continue to charge the battery after the determination of said time slot for one of said different finish time periods corresponding to said one time slot determination.

28. The battery charging apparatus of claim 27, wherein said charge control circuit includes means for causing an initial charging of the battery in a first of said successive time slots, and means for terminating the charging in the event the sensed battery state reaches said predetermined voltage/current state during said initial charging.

29. The battery charging apparatus of claim 27, wherein said charge control circuit includes means for indicating a failure of the battery state to reach the voltage/current state during any of said successive time slots of said initial control time.

30. The battery charging apparatus of claim 27, wherein said charge control circuit includes means for indicating a failure of the battery state to reach the voltage/current state during any of said successive time slots of said initial control time and means for concurrently terminating further charging of the battery.

* * * * *